United States Patent
Raffalt et al.

(10) Patent No.: US 6,628,123 B2
(45) Date of Patent: Sep. 30, 2003

(54) METHOD FOR CONTROLLING A TRANSDUCER DEVICE IN LEVEL SENSORS AND DEVICE FOR CARRYING OUT SUCH A METHOD

(75) Inventors: Felix Raffalt, Hausach (DE); Adrian Frick, Wolfach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 09/785,441

(22) Filed: Feb. 20, 2001

(65) Prior Publication Data

US 2002/0140441 A1 Oct. 3, 2002

(30) Foreign Application Priority Data

May 15, 2000 (DE) .......................................... 100 23 305

(51) Int. Cl.[7] .............................................. G01R 31/08
(52) U.S. Cl. ........................ 324/522; 324/519; 324/537
(58) Field of Search ................................ 324/519, 522, 324/537, 663, 679, 621; 73/105; 340/621

(56) References Cited

U.S. PATENT DOCUMENTS 4,845,737 A * 7/1989 Ohlendorf .................... 324/541
5,150,038 A * 9/1992 Kanemaru .................... 324/519
5,559,427 A * 9/1996 Hinds et al. .................. 324/519

FOREIGN PATENT DOCUMENTS

| DE | 198 35 370 | 2/2000 |
|---|---|---|
| DE | 691 10 442 | 2/2000 |

* cited by examiner

*Primary Examiner*—N. Le
*Assistant Examiner*—Christine K. Oda
(74) *Attorney, Agent, or Firm*—Gary M. Nath; Marvin C. Berkowitz; Joshua B. Goldberg

(57) ABSTRACT

A method for controlling a transducer device (7) featuring supply lines (17, 18) in a level sensor. The transducer device (7) is coupled to a fork resonator with fork tines and is used for both oscillation excitation and also for oscillation detection. For detection of a defective transducer device or an incorrectly connected connection of this transducer device (7), the capacitance value between the supply lines (17,18) or a variable proportional to this value is determined during the oscillation excitation and if there is deviation from a predetermined desired value by a predetermined amount, a fault signal is generated.

23 Claims, 2 Drawing Sheets

METHOD FOR CONTROLLING A TRANSDUCER DEVICE IN LEVEL SENSORS AND DEVICE FOR CARRYING OUT SUCH A METHOD

BACKGROUND OF THE INVENTION

1. Field of the Invention

The invention pertains to a method for controlling a transducer device in level sensors according to the preamble of claim 1, as well as to a device for carrying out this method.

2. Description of the Related Art

Such a method is known, e.g., from German Patent Application No. DE 19 621 449 A1 of the applicant. This document also describes the design in principle of a fork resonator.

A general requirement in oscillating resonators and oscillating fork systems is the monitoring of connector plugs and lines for breaks between the transducer device, which is generally formed as a piezoelectric actuator, and the evaluation electronics.

Until now, this problem has been solved, e.g., by feeding back the transmitted signal over a corresponding second parallel line. If the feedback signal is missing, then there is a defect in the connection, and the sensor electronics produce a fault signal. However, based on the corresponding high technical expense, e.g., required by the doubling of signal lines and plug connector terminals, is well as by the associated evaluation circuit, in practice it must be sufficient to monitor the ground line, which allows only the detection of gross errors, such as a possibly unplugged plug connector or severed cable wire.

Another solution to the problem is described in the initially cited German Patent Application No. DE 19 621 449 A1 of the applicant. Here, a resistor is connected in parallel with the piezoelectric element used for monitoring. The signal change generated in this way is compensated by equal and out-of-phase power supplied to a resistor. If there is an interruption at an arbitrary point of the signal current circuit, then the current balancing point is disturbed and the oscillating frequency of the fork resonator leaves the nominal operating region, which leads to the output of a fault signal.

The problem with this last solution is that for reduced-size oscillating forks with three times the oscillating frequency relative to standard oscillating forks, the parallel resistor must have a value that is three-times smaller in order to effect a sufficient frequency shift in the error case for tripled idle currents. However, the usable signal is excessively damped by such a reduced-size parallel resistor. Furthermore, the mounting of a monitoring element on the actuator is only possible by complicated means due to the extremely narrow spatial requirements for reduced-size oscillating forks. In addition, for high-temperature operation of the oscillating forks, the parallel resistor and its contacts must be suitable for prolonged exposure to such high temperatures (e.g., 200° C.).

BRIEF SUMMARY OF THE INVENTION

The task of the invention is to present a method and a device that monitor the entire power circuit of the transducer device for interruptions without requiring additional lines or components on the actuator element itself. In addition, the method or device to be disclosed should prevent signal damping and should guarantee failure security of the entire system.

This task for the method is solved through the features of claim 1.

A device for carrying out the method is the object of claim 11.

Refinements of the invention are the object of the subordinate claims.

The essence of the invention is that during the oscillation excitation, the capacitance between the lines of the transducer device or a variable proportional to it is detected, and if there is deviation from a predetermined desired value by a predetermined amount, then a fault signal is generated. Thus, simultaneously during the oscillating process, the capacitance of the transducer device, e.g., of the piezoelectric element of such a transducer device including the cable supply line is determined and when a predetermined value is not met, a fault signal is produced.

The capacitance measurement is done preferably through evaluation of the current or the amount of current (charge) that flows during discharge of the piezoelectric element and supply line.

BRIEF DESCRIPTION OF THE DRAWINGS

The method according to the invention and a device for carrying out the method are explained with reference to an embodiment in connection with two figures. Shown are.

DETAILED DESCRIPTION OF THE INVENTION

Figure 1:
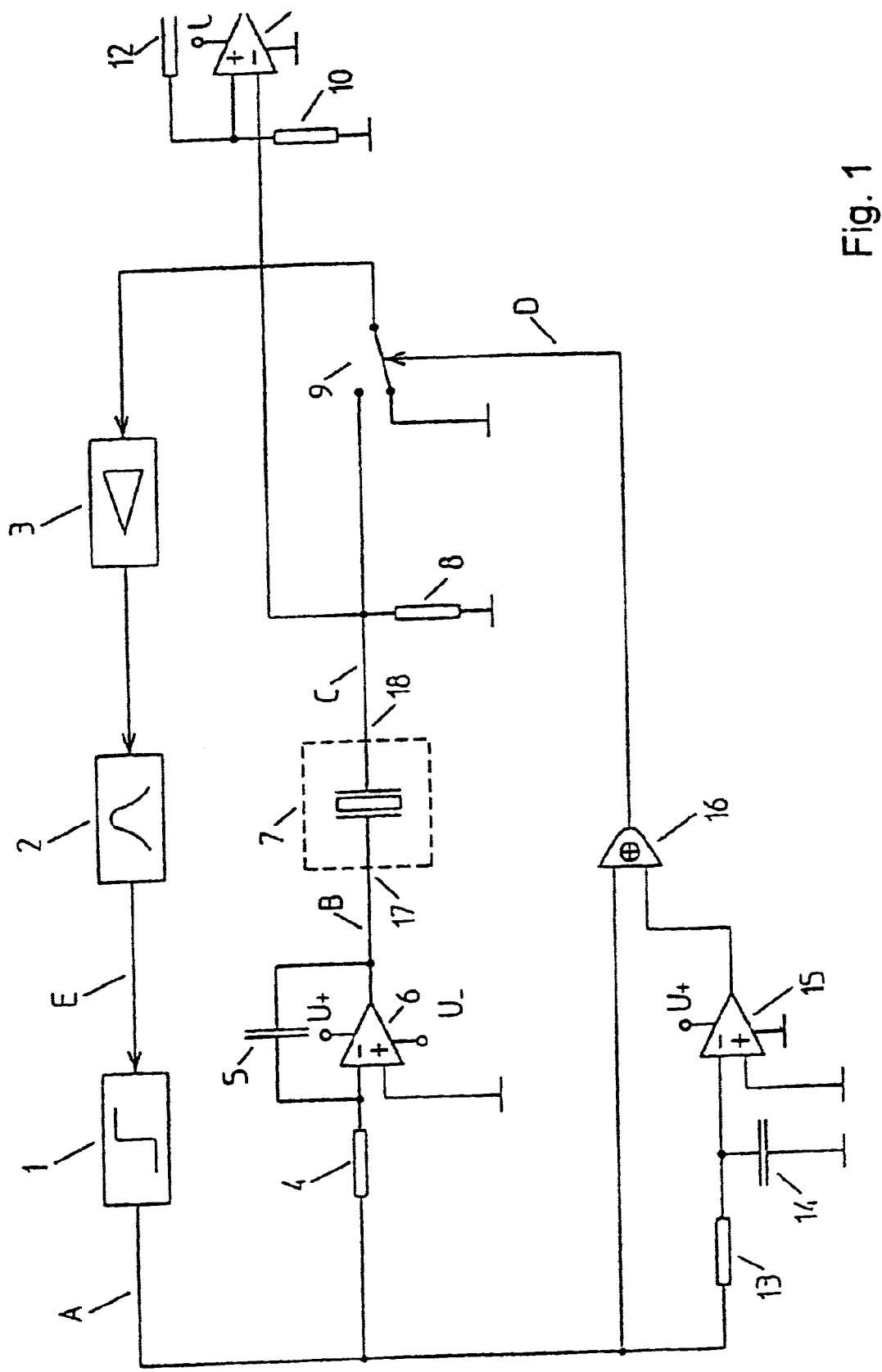
FIG. 1, a block circuit diagram of a vibration level limit switch.
Figure 2:
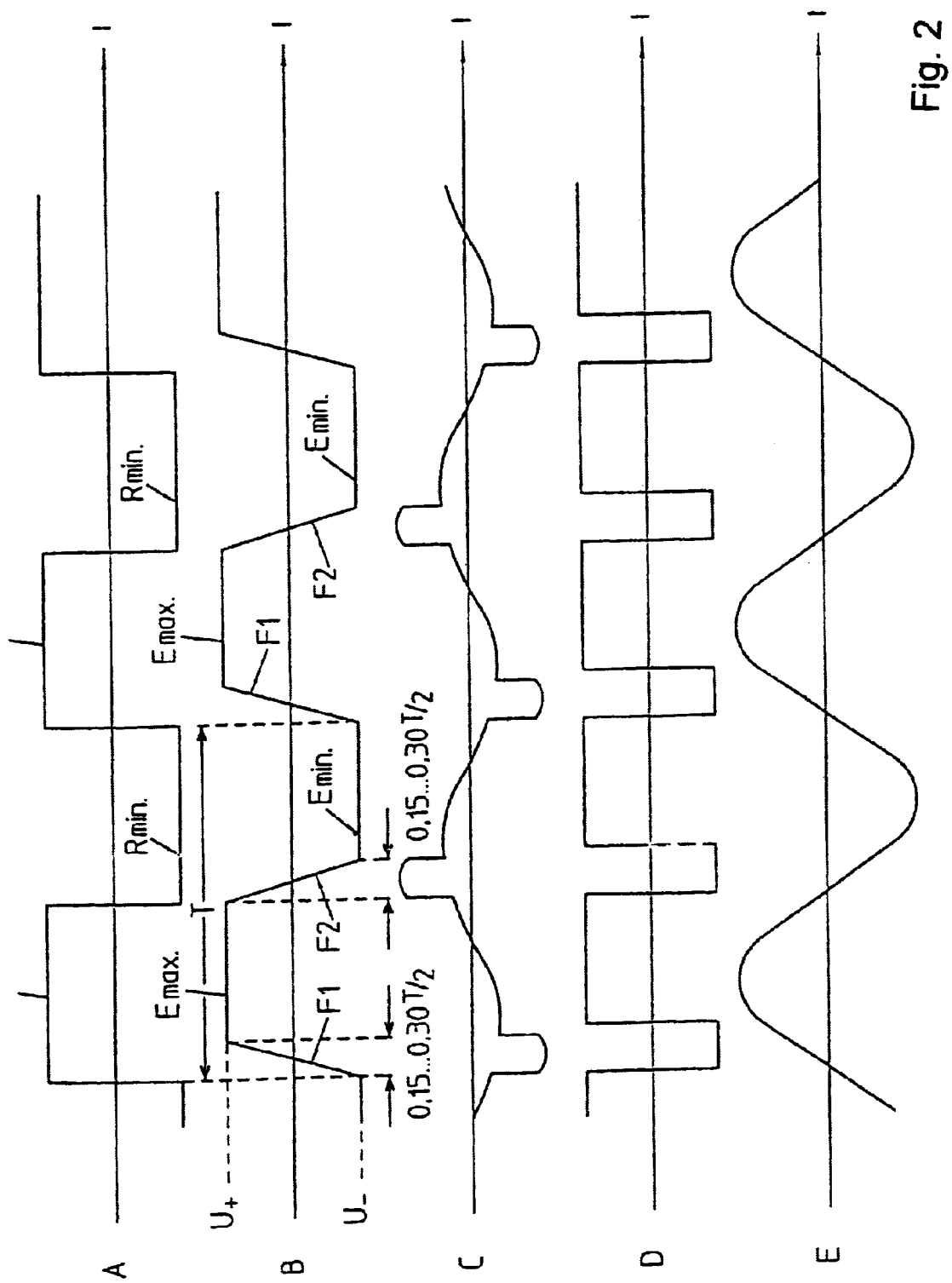
FIG. 2, the temporal waveforms of several signals of the circuit shown in FIG. 1.

In the following embodiment, an individual piezoelectric element is shown in FIG. 1 as an excitation and detection element. However, it can be replaced by a transducer with a similar effect (e.g., several piezoelectric elements, inductive transducer or the like).

The block circuit diagram shown in FIG. 1 as an example of a vibration level limit switch has an amplifier device 1, 2, 3 and a transducer device 7, preferably a piezoelectric transducer device, that is connected in the feedback loop of the amplifier device. In detail, the amplifier device comprises an amplifier 3 with a base frequency band filter 2 connected to the output of the amplifier and a zero-crossing detector 1 or a square-wave generator stage 1 connected to the output of the band filter. The output of the zero-crossing detector 1 is connected to the input of an integrator. This integrator features an operational amplifier 6. The non-inverting input of this operational amplifier 6 is connected to reference potential. The inverting input is connected, on the one hand, via a capacitor 5 to the output of the operational amplifier 6 and on the other hand, via a resistor 4 to the output of the zero-crossing detector 1. The output of the operational amplifier 6 of the integrator is connected via a supply line 17 to a terminal of the transducer device 7. The other terminal of the transducer device 7 is connected via a supply line 18 to a terminal of a resistor 8. The other terminal of the resistor 8 is at reference potential. The connection point between resistor 8 and the supply line 18 is also connected to an input terminal of a change-over switch 9. Another input terminal of the change-over switch 9 is at reference potential. The output terminal of the change-over switch 9 is in contact with the input of the amplifier 3. The change-over switch 9 is switched by a control signal taken from the output of an EXOR gate 16. A first input of this EXOR gate is connected to the output of the zero-crossing detector 1 and at the same time to the free terminal of the resistor 4 not connected to the operational amplifier 6. A second input of the EXOR gate 16 is connected to the output of a comparator 15 whose non-inverting input is at reference potential and whose inverting input is likewise connected via a resistor 13 to the output of the zero-crossing detector 1. Between reference potential and the inverting input of the operational amplifier 15 or comparator 15 there is a capacitor 14.

The line 18 is also connected to a comparator 11 exhibiting hysteresis, and in this way the line 18 is in contact with the inverting input of the comparator 11. The non-inverting input of this comparator 11 is connected on the one hand via a resistor 10 to reference potential and on the other hand via another resistor 12 to the output of the comparator 11. The output of the comparator 11 is connected to a frequency evaluation stage 20. The frequency evaluation stage 20 generates an optical and/or acoustic fault signal when it determines by the means and method to be explained below that the transducer device 7 is not correctly connected or that there is a line defect in the circuit arrangement shown in FIG. 1.

The following functional procedure results for the circuit shown in FIG. 1.

The oscillator detection signal amplified by input amplifier 3 is fed to the base frequency hand filter 2 which generates the filtered and phase-corrected, almost sinusoidal intermediate signal E. This signal is transformed by the zero-crossing detector 1 into a square-wave signal A. By means of known sensors, this signal A is used as the excitation signal for the piezoelectric element 7.

The signal A is led to an integrator 4, 5, 6 for reducing its harmonic content. The integrator generates the trapezoidal signal B. The integration time constant is chosen by means of the components 4, 5 such that the operational amplifier 6 reaches its maximum and minimum final value Emax, Emin, respectively, from 0.15 to 0.30%, preferably about 25% [sic; 0.25%], of the half-cycle T/2 of signal A. Because the operational amplifier 6 preferably features a rail-to-rail output stage, these values correspond to the positive and negative operating voltages U-, U, respectively [sic; Ur, U-, respectively]. Thus, the signal B has the full operating voltage swing and has edge characteristics defined by means of resistor 4 and capacitor 5 through the integration process. Compared with the square-wave signal A, the trapezoidal signal B has strongly reduced harmonics, so that in the piezoelectric oscillating element 7, only minimum mechanical harmonic content is excited.

The voltage-time area of the signal B is somewhat smaller compared with that of the square-wave signal A but clearly greater than that for a sinusoid. For the same power supply voltage, the signal B enables an advantageously greater excitation supply in comparison with a sinusoid.

The current flow through the piezoelectric element 7 is measured at the measurement resistor 8. The flow consists of the discharge current of the piezoelectric element 7 required by the excitation signal and the piezoelectric charge quanta based on the mechanical fork resonator oscillation. The signal C shows the superimposition of both current components. The separation of the oscillation detection signal and the operating signal is done by means of change-over switch 9. The switch blanks the undesired discharge current in the detection signal according to the measurement of a control signal D by grounding the signal input of the input amplifier 3 curing the discharge phase. The control signal D required here is derived from signal A because by means of resistor 13, capacitor 14, and comparator 15, an auxiliary signal that is phase-shifted and inverted relative to A is generated. Signal D results from taking the exclusive-or of this auxiliary signal and the signal A in EXOR gate 16. The low phase of the control signal D defines the time of the signal blanking and is always chosen to be somewhat longer than the rising or falling signal phase in signal B.

The signals B and C are transmitted by means of lines 17, 18 to the piezoelectric element 7. If one of these lines of the electronics is severed, the oscillations of the oscillator are interrupted, which is recognized by the evaluation electronics connected at the output as an error state, However, if the interruption is at the piezoelectric element, then the oscillator oscillates at a certain cable length of the lines 17, 18 because it is fed back through the remaining cable capacitance.

The oscillating frequency is dependent on the remaining cable length as well as electromagnetic noise and can be in the nominal operating region of the oscillating fork so that the defect cannot be recognized by the frequency evaluation electronics connected at the output, if necessary.

For functional monitoring of the piezoelectric supply lines 17, 18, the capacitance between these lines is measured during the oscillating process.

The piezoelectric capacitance is usually around 2 nF and the cable capacitance is usually a maximum of around 0.5 nF. A determination whether the piezoelectric element is connected is thus unambiguously possible by referring to the capacitance value.

For this purpose, the signal C that contains the piezoelectric discharge current and that is measured across measurement resistor 8 is evaluated by means of comparator 10, 11, 12 with hysteresis. The resistors 10, 12 give the comparator 11 a switching hysteresis that is symmetrical about ground potential. During the rising or falling signal phase of B, voltage amplitudes that are proportional to the rate of change of signal B and to the sum capacitance of piezoelectric element 7 and lines 17, 18 appear across measurement resistor 8. The switching hysteresis of the comparator 11 is chosen to be a size so that the capacitance of the lines 17, 18 cannot effect a change of the comparator 11, while for the connected piezoelectric capacitance, the comparator 11 switches to the opposite position for each edge change of signal B. Thus, there is a signal at the output of comparator 11. This signal corresponds to signal A relative to the differences in propagation time and is supplied to an error evaluation unit that is not shown in greater detail.

Here, the input of the frequency evaluation stage is not connected to the signal A, which corresponds to the state of the art, but instead it is connected to the output signal of the comparator 11. Thus, an interruption in the piezoelectric current circuit leads to a response from the oscillation fault monitoring in the frequency evaluation stage.

Because the comparator circuit 10, 11, 12 and the measurement resistor 8 permanently carry the normal measurement signal, it is impossible for there to be an unnoticed fault of these circuit parts. Thus, the conformance to TÜV requirement class 3 is met.

While the current circuit monitoring method by means of parallel resistors or feedback lines is merely an indirect check of the piezoelectric element current supply, the described method enables direct control of the piezoelectric element relative to physical presence in the current circuit through measurement of the piezoelectric element capacitance.

FIG. 1 represents a practical embodiment of an arrangement in which a piezoelectric element is excited electrically harmonics-poor, wherein a detection signal for the mechanical oscillation is derived from the same piezoelectric element with reference to the piezoelectrically generated charge quanta, and the internal capacitance is measured during the oscillation process from the same piezoelectric element.

The harmonics-poor excitation of the piezoelectric element can obviously also be used without the line break detection described in the embodiment. In addition, several piezoelectric elements instead of a single piezoelectric element can be used. Finally, the harmonics-poor excitation is also possible here, where one or more piezoelectric elements are used exclusively for the oscillation excitation.

Although a capacitive transducer, via., a piezoelectric element, was described as the transducer device in the embodiment, an inductive transducer can also be used. As the variables to be monitored, then the inductance value between the lines of the transducer or a variable proportional to this value can be detected.

List of Reference Numbers
1 Zero-crossing detector
2 Base frequency band filter
3 Amplifier
4 Resistor
5 Capacitor
6 OP amplifier
7 Piezoelectric element
8 Resistor
9 Change-over switch
10 Resistor
11 OP amplifier, comparator
12 Resistor
13 Resistor
14 Capacitor
15 OP amplifier
16 EXOR gate
20 Frequency evaluation stage
A Signal
B Excitation signal
C Signal
D Signal
E Sinusoid
V+ Positive power supply potential
V− Negative power supply potential
Rmax Maximum level
Rmin Minimum level
Emax Maximum level
Emin Minimum level
T Period
F1 Rising edge
F2 Falling edge

What is claimed is:

1. Method for controlling a transducer device (7) with first and second supply lines (17, 18) in a level sensor, in which the transducer device (7) is coupled to a fork resonator with fork tines and is used for both oscillation excitation and also oscillation detection, characterized in that during the oscillation excitation, the capacitance value between the supply lines (17, 18) or the inductance value or a variable proportional to the capacitance value or the inductance value is determined, and if there is deviation from a predetermined desired value by a predetermined amount, then a fault signal is generated.

2. Method according to claim 1, characterized in that the fault signal is generated if the predetermined desired value is not reached by the predetermined amount.

3. Method according to claim 1, characterized in that the determination of the capacitance value or the inductance value is achieved through evaluation of the current or the current amount and thus the charge that flows in the transducer device (7) and said first and second supply lines (17, 18) during discharge processes.

4. Method according to claim 1, characterized in that the measurement range for the capacitance measurement is in the nF range.

5. Method according to claim 1, characterized in that a faultless operation is signaled if the detected capacitance value is greater than approximately 1 nF.

6. Method according to claim 5, characterized in that the faultless operation is signaled if the detected capacitance value is greater than approximately 2.5 nF.

7. Method according to claim 1, characterized in that, a fault operation is signaled if the detected capacitance value is less than 1 nF, whereby the fault signal is outputted.

8. Method according to claim 7, characterized in that the fault operation is signaled if the detected capacitance value is less than approximately 0.5 nF.

9. Method according to claim 1, characterized in that for determining the capacitance value, the discharge currents flowing in the transducer device (7) are measured at a measurement resistor (8) and evaluated in a comparator (11).

10. Method according to claim 9, characterized in that the comparator (11) has a switching hysteresis.

11. Method according to claim 10, characterized in that the switching hysteresis is chosen to be symmetrical.

12. Method according to claim 8, characterized in that the switching hysteresis of the comparator (11) is chosen to be a size such that a capacitance or inductance given only by the first and second lines (17, 18) does not lead to a change of the comparator (11), while for the first and second lines (17, 18) that are correctly connected to the transducer device (7) there is a switch of the comparator (11) after measurement of an edge change of an excitation signal (B) is supplied to the transducer device (7).

13. Device for carrying out the method according to claim 1, characterized in that the transducer device (7) is connected in a feedback loop of an amplifier arrangement (1, 2, 3), an ohmic measurement device (8) is connected to said first supply (18) of the transducer device (7), where said first supply is connected to the input of the amplifier arrangement (1, 2, 3), discharge currents of the transducer device are transformed in the transducer device into an electrical signal, said measurement device (8) is connected to a first input (−) of a comparator (11) whose second input (+) is at a given potential, and a frequency evaluation stage (20) is connected to the output of the comparator (11), where the frequency evaluation stage generates the fault signal if a signal that is measured at the output of the comparator (11) does not meet a predetermined frequency.

14. Device according to claim 13, characterized in that an integrator (4, 5, 6) is arranged between an output of the amplifier arrangement (1, 2, 3) and said second supply line (17) of the transducer device (7).

15. Device according to claim 13, characterized in that the amplifier arrangement (1, 2, 3) features an input amplifier (3) with a base frequency band filter (2) connected to the output of the input amplifier and a square-wave generating stage (1) on the output side.

16. Device according to claim 13, characterized in that the measurement device (8) features a measurement resistor (8) connected between reference potential and the first supply line (18) of the transducer device.

17. Device according to claim 13, characterized in that the comparator (11) is fed back through an ohmic device (12) between output and second input (+).

18. Device according to claim 17, characterized in that the ohmic device (12) is a resistor, and said resistor is dimensioned so that the comparator (11) exhibits a switching hysteresis that is symmetrical to the reference potential.

19. Device according to claim 13, characterized in that an ohmic device (10) is connected between reference potential and second input (+) of the comparator (11).

20. Device according to claim 19, characterized in that the ohmic device (10) is a resistor, and said resistor is dimensioned so that the comparator (11) exhibits a switching hysteresis that is symmetrical to the reference potential.

21. Device according to claim 13, characterized in that a change-over switch (9) is arranged between the input of the amplifier arrangement (1, 2, 3) and the first supply line (18) of the transducer device (7), where the change-over switch (9) switches either reference potential or a signal (C) that is measured at the first supply line (18) of the transducer device (7) to the input of the amplifier arrangement (1, 2, 3) according to the measurement of a changed signal (D).

22. Device according to claim 13, characterized in that the transducer device (7) is a piezoelectric transducer device.

23. Device according to claim 22, characterized in that the piezoelectric transducer device comprises a piezoelectric element that is provided for both the oscillation excitation and also the oscillation detection.

* * * * *

UNITED STATES PATENT AND TRADEMARK OFFICE
CERTIFICATE OF CORRECTION

PATENT NO. : 6,628,123 B2  Page 1 of 1
DATED : September 30, 2003
INVENTOR(S) : Raffalt et al.

It is certified that error appears in the above-identified patent and that said Letters Patent is hereby corrected as shown below:

<u>Column 6,</u>
Line 30, change "8" to -- 10 --.

Signed and Sealed this

Thirtieth Day of December, 2003

JAMES E. ROGAN
*Director of the United States Patent and Trademark Office*